United States Patent
Forsyth (10) Patent No.: US 10,986,770 B2
(45) Date of Patent: Apr. 27, 2021

(54) COATING FLOWABLE CONTACT-TOLERANT GRANULES, INCLUDING SEEDS

(71) Applicant: Daniel L Forsyth, Oelwein, IA (US)

(72) Inventor: Daniel L Forsyth, Oelwein, IA (US)

( * ) Notice: Subject to any disclaimer, the term of this patent is extended or adjusted under 35 U.S.C. 154(b) by 85 days.

(21) Appl. No.: 16/264,246

(22) Filed: Jan. 31, 2019

(65) Prior Publication Data
US 2019/0239417 A1    Aug. 8, 2019

Related U.S. Application Data

(60) Provisional application No. 62/626,592, filed on Feb. 5, 2018.

(51) Int. Cl.
*A01C 1/06* (2006.01)
*B05C 3/10* (2006.01)

(52) U.S. Cl.
CPC . *A01C 1/06* (2013.01); *B05C 3/10* (2013.01)

(58) Field of Classification Search
CPC .... A01C 1/06; A01C 1/00; B05C 3/10; A61K 9/16; A01G 7/04; B65G 65/00
See application file for complete search history.

(56) References Cited

U.S. PATENT DOCUMENTS

| | | | | |
|---|---|---|---|---|
| 3,031,773 A | * | 5/1962 | Dunkle | F26B 17/16 34/177 |
| 3,146,129 A | * | 8/1964 | Odenwald | A23N 17/00 118/75 |
| 5,316,128 A | * | 5/1994 | Long | B65G 47/19 198/530 |
| 5,891,246 A | | 4/1999 | Lund | |
| 10,582,667 B2 | * | 3/2020 | Wolfe | A01C 1/08 |
| 2013/0330155 A1 | * | 12/2013 | Kaeb | A01C 1/06 414/287 |
| 2015/0351312 A1 | * | 12/2015 | Bardi | A01C 1/06 47/57.6 |
| 2015/0359164 A1 | | 12/2015 | Bardi | |

FOREIGN PATENT DOCUMENTS

JP    2000-279004 A    10/2000

* cited by examiner

*Primary Examiner* — Dan-Wei D. Yuan
*Assistant Examiner* — Andrew J Bowman
(74) *Attorney, Agent, or Firm* — Keri Ann K. S. Krzykowski; Martin E. Hsia (57) ABSTRACT

A process and apparatus for coating flowable contact-tolerant granules, such as seeds, includes a rotating wheel having peripheral apertures so when the granules are dropped onto the central portion, they bounce and contact other granules and are impelled by centrifugal force to fall through the peripheral apertures down a narrowing funnel preferably (but not necessarily) having a different rotation rate. The coating is spread by gentle granule-to-granule contact and contact with any coating material on the wheel and in the funnel. The granules then flow into an inclined conveyor belt, an inclined auger, or other conveyor, which rolls the granules as they are conveyed upwardly, so that the coating is further spread by gentle granule-to-granule contact.

13 Claims, 8 Drawing Sheets

COATING FLOWABLE CONTACT-TOLERANT GRANULES, INCLUDING SEEDS

TECHNICAL FIELD

The present invention relates to coating flowable contact-tolerant granules, including seeds. "Contact-tolerant" means the granules are not substantially damaged by contact with ether granules when the granules are flowing together through a coating apparatus.

BACKGROUND ART

Seeds are often treated by coating them with insecticides, fungicides, herbicides, fertilizers, binders and flow enhancers (to prevent clumping and buildup), dyes (required by government regulation), and other materials, to help protect, or nourish the crop being grown from the seeds. Fertilizer also may be granulized, that is, provided in granules, and may be coated with herbicides and other coating materials, so that both fertilizer and herbicide can be applied in one application trip over the fields, instead of requiring two separate application trips. Some of the materials used to coat seeds (or fertilizer granules) have a limited shelf life, so farmers prefer to apply the coating just before planting or application, which can be referred to as "just in time" treatment. Further, farmers may need to coat multiple different types of seeds with multiple different types of coatings, depending on conditions, types of seeds, and other factors. Seed companies or seed dealers can provide coated seeds, but the seeds may not have been freshly treated before the farmer is ready to plant them. Also, farmers may need coatings or seeds that are not offered by seed companies or seed dealers; and farmers cannot return unused coated (treated) seed to seed companies, although they may be able to return untreated "naked" seed.

Methods and apparatus for coating seeds and other various materials are known, but rarely provide a sufficiently fast processing rate, with sufficiently gentle treatment to avoid substantial damage to seeds that are to be planted, and rarely allow a farmer to be able to coat seeds on an individual farmer, as-needed, basis. Other apparatus and systems for coating seeds are also too expensive or too large for individual farmers, or too complex for farmers to be able to repair and maintain themselves (as long as they can obtain necessary parts).

Methods and apparatus already known for coating seeds include a drum rotating around a horizontal axis of rotation, with an interior atomizer applying coating material; and an upwardly inclined auger enclosed in a tube that churns coated seeds as they are impelled upwardly.

Some methods and apparatus for coating seeds are not applicable to other situations where items must be coated, such as pharmaceuticals or candies, because pharmaceuticals or candies would be crushed or substantially damaged, or their functioning would be impaired, by contact with other pharmaceuticals and candies, so that coating cannot be applied by granule-to-granule contact.

Conversely, some methods and apparatus for coating other types of granules are not suitable for coating seeds. Some methods and apparatus are too rough on seeds, which causes the seeds to chip or split or otherwise become damaged. Other methods and apparatus are too slow.

Preferably, apparatus for coating seeds should be as compact as possible and simple to manufacture, maintain, and repair, for movement, operation, cleaning and storage by a single farmer using conventional farm equipment.

U.S. Pat. No. 6,155,185 to Memory, et al discloses a method and apparatus for coating seeds by entraining seeds within an air flow that includes a conical mixing chamber to diffuse the air/seed flow into a whirling motion to evenly coat individual seed particles.

U.S. Pat. No. 9,671,164 to Forsyth, et. al discloses a system and method of at least partially drying seeds treated with a liquid.

U.S. Pat. No. 9,393,587 to Ohno, et al discloses a method and apparatus for forming a coating layer on a golf ball.

The C3 Conveyor sold by Quality Plus Manufacturing of Oelwein, Iowa, discloses a conveyor belt, tilted at an incline, open at both top and bottom ends, and having a floor between the ends, substantially parallel to, and extending along the bottom, of the belt. On the bottom portion of the conveyor belt, paddles extend downwardly from the belt towards, and in close proximity to (but not touching), the floor. The conveyor belt spins "backwards", so that the paddles on the bottom (not the top) of the belt move upwardly along the incline, and push seeds that are on the floor upwardly, thus causing seed-to-seed contact as the seeds roll over each other as they go up, until the seeds are discharged out the top end. The C3 Conveyor can be used with a coating application control system positioned at the bottom end, for controllably dispensing a coating material that is a liquid, suspension, powder, adherent dry material, or other fluent that can be spread by seed-to-seed contact (hereinafter referred to collectively as "liquid"), which is connected to an application chamber that optionally contains a separator to separate a flow of seeds into two or more subflows, and spray applicators (or other applicators or devices) that can apply a coating material onto the outward facing sides of the subflows, partially coating the granules in the subflows. Currently, the seeds then flow directly into the bottom of the C3 Conveyor, where the coating material is further spread by seed-to-seed contact as the seeds are pushed by the paddles, rolling over each other as they move upwardly. In this manner, almost all of the seeds are completely covered by the coating material when they are discharged out of the C3 Conveyor. However, there is a need to achieve 100% coverage of each of the seeds. Also, certain varieties of seeds are especially difficult to treat, and it would be preferable to use a shorter conveyor, so there is a need to provide an additional coating step or apparatus that could treat these varieties or allow use of a shorter conveyor.

Seeds are flowable contact-tolerant granules, meaning they consist of discrete independent granules that can flow like a liquid without being substantially damaged, and that the granules' function is not impaired by contacting with other similar granules while the units are physically flowing together. Because seeds are flowable contact-tolerant granules, a coating that is spreadable by granule-to-granule contact can be applied to seeds that partially coats the seeds, and then the coating can be spread to finish coating the seeds by seed-to-seed contact as the seeds are flowing, such as tumbling a stream of seeds in a rotating drum, or moving upward in a conveyor as described above. Preferably, the coating dries on (or otherwise unremovably adheres to) the seeds during coating, or after they have been completely coated.

A substantial problem with coating substantial quantities of seeds and other granules is that the granules must flow through the coating process quickly enough, yet a coating material can only be directly applied to the exposed surfaces of the outer granules in a flow (or subflow) of granules, leaving inner granules, and the unexposed surfaces of the outer granules, uncoated.

Although attempts have been made to spread a coating material through post-application (meaning after application of a liquid coating material that is spreadable by granule-to-granule contact) granule-to-granule contact, such methods have not been successful in achieving complete coating of all granules (especially seeds), without substantially damaging the granules, at a satisfactory flow rate, using mechanically simple apparatus and processes. As used herein, "gentle" means a process that does not cause substantial damage to granules.

As will be recognized by a person of ordinary skill, methods and apparatus for coating seeds can also coat other flowable contact-tolerant granules.

Accordingly, it is an object of the present invention to provide a method and apparatus for coating seeds and other flowable contact-tolerant, granules using post-application gentle granule-to-granule contact.

DISCLOSURE OF THE INVENTION

The present invention is an apparatus for coating flowable contact-tolerant granules, having a hopper to receive the granules with a bottom orifice. Preferably, an application chamber having an optional separator (preferably triangular) and optional converging lower walls is positioned below the orifice, so that granules flow from the hopper into the application chamber as a single flow of granules, which then flows over the optional separator and is separated into two or more flowing subflows of granules. At least one applicator is positioned to apply a desired coating material onto the flowing subflows of granules, partially coating the granules in the subflows. Preferably the coating material is spreadable by granule-to-granule contact. If there is no separator, then the flow of granules flows downward and at least one applicator applies a desired coating material onto the flowing granules, partially coating the granules in the flow. The applicator or applicators can be spray applicators, in which a pressurized fluid is used to spray coating material; atomizers, in which coating material is placed in a rapidly spinning perforated container and flung outwards through the perforations; or any other applicator that can be used to partially coat a flow of granules with a coating material. Preferably, the flowing subflows of granules then are directed by the optional converging lower walls of the application chamber to recombine to fall as a single flow of partially coated granules (or if there was no separator, then the partially coated granules fall from the orifice and in front of the applicators to create a single flow of partially coated granules), from a drop height, onto a wheel having a rigid central portion, rotating at a wheel rotation rate around a substantially vertical axis of rotation and having peripheral apertures larger than the partially coated granules, positioned with its central portion below the flow of falling granules. The wheel can be driven in any manner known to the ordinary artisan, such as being driven by a drive wheel contacting the circumference or periphery, or being axially driven, or being driven in any other manner. The drop height is operably at least approximately one inch (approximately 2.5 centimeters), and preferably at least approximately 4 inches (approximately 10 centimeters).

Preferably, the central portion of the wheel is rigid, which means that when granules fall onto the central portion from the drop height, they bounce, either off the central portion or off each other. Preferably, the granules that had been in one subflow when being recombined retain some difference in momentum from granules that had been in another subflow, so the granules that had previously been in the different subflows do not bounce off the central portion or each other as they would if a single flow had just been dropped vertically onto a rigid stationary surface. Preferably, when the granules fall near or onto the center of the rotating wheel (where there is little or no centrifugal force), the granules bounce but remain near or in the center of the wheel for a "dwell time" because of these retained differences in momentum and because of rotation of the wheel, and then move outward because of the wheel's rotation (but neither validity nor enforceability of this patent shall be affected or impaired if this explanation is incorrect or incomplete). If the same volume of granules were flowed (without having differing momentums from different subflows) onto a stationary wheel, it would create a pileup that backs up the system.

Preferably, this bouncing of granules off the rotating wheel and each other, within the gathered granules for the dwell time, creates a "boiling effect" among the gathered bouncing partially coated granules near and in the center, which increases the spreading of the coating among the gathered bouncing partially coated granules through post-application gentle granule-to-granule contact (and also through contact, with any coating material on the wheel, or "granule-to-wheel" contact). Preferably, the flow or granules is maintained so that most of the granules touch, and bounce off, the central portion of the wheel or each other, and remain in the central portion for a "dwell time", thereby maintaining this "boiling effect" (instead of just falling onto the wheel and other granules and coming to rest on the center of the wheel (without a "boiling effect")). Eventually, the gathered "boiling" granules move outwards from the center of the wheel, and are impelled by centrifugal force to the peripheral, apertures and fall through the peripheral apertures. As the granules move outwards towards the apertures, coating material continues to be spread on the granules by gentle granule-to-granule contact, and by contact with any coating material on the wheel, before the granules fell through the peripheral apertures. The range of flow rates necessary to obtain this "boiling effect" will vary depending on the physical properties (hardness, shape, etc.) of the granules and the drop height, and some types of granules may not be able to achieve this boiling effect. The flow is adjusted based on the physical properties of the granules and the drop height to maximize gentle turbulence between the granules from the boiling effect in the center of the wheel (and thereby maximize gentle granule-to-granule, and granule-to-wheel, spreading of the coating), while moving the granules outwards to the peripheral apertures quickly enough to avoid a pileup that backs up the system.

A funnel (preferably conical, but optionally with a polygonal or other non-circular cross section or cross sections), and preferably (but not necessarily) vertical, with the wide end being wide enough to catch all granules falling through the peripheral apertures, is positioned under the wheel, and receives all granules falling through the peripheral apertures. The funnel preferably has a funnel rotation rate different from the wheel rotation rate, so that granules falling through the peripheral apertures (while traveling at the wheel rotation rate) contact the funnel walls (rotating at the funnel rotation rate), while falling down the funnel towards the narrow end, which causes the granules to tumble against each other, and coating material is further spread on the granules by gentle granule-to-granule contact and by contact with any of the coating material on the funnel walls ("granule-to-funnel" contact). However, the funnel rotation rate can be the same as the wheel rotation rate, or can be zero.

Preferably, the granules are then rolled against each other with a roller, which is a device that gently rolls the granules against each other. The roller can be a backward conveyor with paddles, a forward conveyor, or an auger (all as described below), or any other device that rolls the granules against each other sufficiently gently to avoid damaging the granules, and spreads the coating by granule-to-granule contact.

A reverse conveyor having a conveyor belt is tilted at an inclined angle, open at both top and bottom ends, with the bottom end positioned to receive granules falling through the narrow and of the funnel. Preferably, a conveyor floor that is underneath, and spaced apart from and substantially parallel to, the belt, extends between the top and bottom ends. Preferably, paddles extend downwardly from the belt towards, and in close proximity to, the conveyor floor, separated from the conveyor floor by a paddle separation that is preferably greater than the size of the granules. When the conveyor belt spins "backwards", so that the paddles on the bottom of the belt move upwardly along the incline, the paddles push granules that are on the conveyor floor upwardly, so that the granules roll over each other, and the coating material is further spread on the granules by gentle granule-to-granule contact and by contact with any of the coating material on the conveyor floor, until the granules are discharged out the top end.

Alternatively, a forward conveyor with a conveyor belt that spins "forwards" (so that the top portion of the belt moves upwardly) can be used, with the conveyor belt preferably at an inclined angle greater than the angle of repose (maximum angle at which the granules can rest on the conveyor belt without moving) of the granules on the conveyor belt, so that the partially coated granules roll downwards over each other and the coating material is further spread on the granules by gentle granule-to-granule contact and by contact with any of the coating material on the conveyor belt, until the granules are discharged out the top end. Optionally, retarding structures such as upwardly extending rakes, tines or teeth can be provided on the belt to constrain a sufficient portion of the granules to be carried upwards by the conveyor belt, even though the granules will be rolling against each other downwards (because the inclined angle is greater than the angle of repose), in order to obtain a satisfactory rate of discharge of granules out the top end.

As another alternative, the conveyor belt can be vibrated or otherwise moved as it spins forwards, so that even if the belt is inclined at less than the angle of repose, the partially coated granules roll over each other and the coating material is further spread on the granules by gentle granule-to-granule contact and by contact with any of the coating material on the conveyor belt, until the granules are discharged out the top end. Optionally, retarding structures can be provided on the belt to obtain a satisfactory rate of discharge of granules out the top end.

As another alternative, an auger (or other device that causes partially coated granules to roll over each other and spread coating material by gentle granule-to-granule contact) can be used instead of a conveyor belt, as described below.

In an alternative embodiment, the present invention is also an apparatus for coating flowable contact-tolerant granules, having a hopper to receive the granules with a bottom orifice. Similar to the preceding embodiment, an application chamber having an optional separator and converging lower walls is positioned below the orifice, so that granules flowing from the hopper into the application chamber and over the separator are optionally separated into flowing subflows of granules. Of course, without the optional separator, there would be a single subflow. Preferably, at least one applicator is positioned to apply a desired coating material onto the flowing flow or subflows of granules, partially coating the granules in the flow or subflows. Alternatively or additionally, dry applicators can be used, which apply a dry coating material onto the flowing flow or subflows of granules. The applicator or applicators can be spray applicators, in which a pressurized fluid is used to spray coating material; atomizers, in which coating material is placed in a rapidly spinning perforated container and flung outwards through the perforations; any other applicator that can be used to partially coat a flow of granules with a coating material; or a dry applicator in which a dry material is applied to partially coat a flow of granules with a dry coating material, described in more detail below. The flowing subflows of granules then are directed by the converging lower walls of the application chamber to join together to fall as a single flow of partially coated granules (or if there was no separator, the flow of partially coated granules falls) from a drop height onto a wheel having a rigid central portion, rotating at a wheel rotation rate around a substantially vertical axis of rotation and having peripheral apertures larger than the granules, positioned below the flow of flowing partially coated granules. Many of the granules bounce upwards off the rigid central portion and meet other granules falling down. Because the granules fall near or onto the center of the rotating wheel, where there is little or no centrifugal force, the granules gather near and in the central portion of the wheel, and this bouncing of granules within the gathered granules creates a "boiling effect" among the gathered bouncing partially coated granules near and in the central portion, which increases the spreading of the coating among the gathered partially coated bouncing granules through gentle granule-to-granule contact. The central portion can be flat, convex, concave, or some other shape, to maximize the spreading of the coating. Eventually, the gathered bouncing granules move outwards from the central portion of the wheel and are impelled by centrifugal force to the peripheral apertures and fall through the peripheral apertures. As the granules move outwards towards the apertures, coating material continues to be spread on the granules by gentle granule-to-granule contact, and by contact with any coating material on the wheel, before the granules fall through the peripheral apertures.

Similar to the preceding embodiment, a funnel (preferably conical, but optionally with a polygonal, or other non-circular cross section or cross sections) with the wide end being wide enough to catch all granules falling through the peripheral apertures, is positioned under the wheel and receives granules falling through the peripheral apertures. The funnel preferably has a funnel rotation rate different from the wheel, rotation rate, so that granules falling through the peripheral apertures while traveling at the wheel rotation rate, contact the funnel walls rotating at the funnel rotation rate while falling down the funnel towards the narrow end, which causes the granules to tumble against each other, and coating material is further spread on the granules by gentle granule-to-granule contact and by contact with any of the coating material on the funnel walls. However, the funnel rotation rate can be the same as the wheel rotation rate, or can be zero.

An auger in an enclosure is provided, with the enclosure having a floor extending substantially parallel to, and spaced apart from, the blades of the auger, tilted at an inclined angle, open at both top and bottom ends, with the bottom end positioned to receive granules falling through the narrow end of the funnel. Counterintuitively for an auger that is to move the granules upwardly, the blades of the auger are separated from the floor of the enclosure by a blade separation, which is preferably greater than the size of the granules, and preferably at least twice the size of the granules. When the auger rotates, granules are pushed upwardly, whereby the granules roll over each other and the coating material is further spread on the granules by gentle granule-to-granule contact and by contact with any of the coating material in the auger, until the granules are discharged out the top end.

The present invention is also a process for coating flowable contact-tolerant granules, comprising:

applying a desired coating material onto exposed surfaces of granules in a flow of granules, so that granules in the flow are partially coated on their exposed surfaces;

centrifugal tumbling the granules against each other, by imparting wheel momentum to the granules by flowing the granules onto a wheel having a rigid center, rotating at a wheel rotation rate around a substantially vertical axis of rotation (the wheel having peripheral apertures larger than the granules), whereby the coating material is spread on the granules by gentle granule-to-granule contact and by contact with any of the coating material on the wheel, and the granules are impelled to the peripheral apertures by centrifugal force and fall through the peripheral apertures with wheel momentum, resulting in centrifugal tumbling granules;

funnel tumbling the centrifugal tumbling granules against each other, by causing the centrifugal tumbling granules to fall down a funnel having narrowing funnel walls and a funnel rotation rate, whereby the centrifugal tumbling granules contact the funnel walls rotating at the funnel rotation rate as the granules fall down the narrowing funnel, resulting in funnel tumbling granules, so that coating material is further spread on the granules by gentle granule-to-granule contact and by contact with any of the coating material on the funnel walls;

rolling the granules over each other, by flowing the funnel tumbling granules onto a conveyor belt tilted at an inclined angle having top and bottom ends, a conveyor floor underneath and substantially parallel to the belt, extending between the top and bottom ends, with the bottom end positioned to receive granules from the funnel, also having paddles that extend downwardly from the belt towards, and in close proximity to, the conveyor floor, whereby when the conveyor belt spins backwards, so that the paddles on the bottom of the belt move upwardly along the floor, the paddles push granules that are on the floor upwardly, whereby the granules roll over each other and said coating material is further spread on the granules by gentle granule-to-granule contact and by contact with any of the coating material on the floor, until the granules are discharged out the top end.

Optionally, before the applying step, the flow of granules can be subjected to a separating step that separates the flow of the granules into flowing subflows of granules, and a recombining step before the centrifugal tumbling step, to recombine the subflows into the flow of granules.

Optionally, the granules can be subjected to a boiling effect step by flowing the granules so they fall onto the rigid central portion of the wheel from a drop height, so that granules bounce upwards off the rigid central portion and meet other granules falling down, whereby because the granules fall near or onto the center of the rotating wheel, there is little or no centrifugal force and the granules gather near and in the rigid central portion of the wheel, whereby this bouncing of granules within the gathered granules creates a "boiling effect" among the gathered partially coated granules near and in the rigid central portion.

The present invention is also a process for coating flowable contact-tolerant, granules, comprising:

applying a desired coating material onto exposed surfaces of granules in a flow of granules, so that granules in the flow are partially coated on their exposed surfaces;

centrifugal tumbling the granules against each other, by imparting wheel momentum to the granules by flowing the granules onto a wheel having a rigid central portion, rotating at a wheel rotation rate around a substantially vertical axis of rotation (the wheel having peripheral apertures larger than the granules), whereby the coating material is spread on the granules by gentle granule-to-granule contact and by contact with any of the coating material on the wheel, and the granules are impelled to the peripheral apertures by centrifugal force and fall through the peripheral apertures with wheel momentum, resulting in centrifugal tumbling granules;

funnel tumbling the granules against each other, by causing the centrifugal tumbling granules to fall down a funnel having narrowing funnel walls and a funnel rotation rate, whereby the centrifugal tumbling granules contact the funnel walls rotating at the funnel rotation rate as the granules fall down the narrowing funnel, resulting in funnel tumbling granules, so that coating material is further spread on the granules by gentle granule-to-granule contact and by contact with any of the coating material on the funnel walls;

rolling the granules against each other by flowing the funnel tumbling granules into an enclosed auger tilted at an inclined angle having top and bottom ends, with the bottom end positioned to receive granules from the funnel, whereby when the auger rotates, granules are pushed upwardly, whereby the granules roll over each other and the coating material is further spread on said granules by gentle granule-to-granule contact and by contact with any of the coating material in the auger, until the granules are discharged out said top end.

As in the preceding embodiment, optionally, before the applying step, the flow of granules can be subjected to a separating step that separates the flow of the granules into flowing subflows of granules, and a recombining step before the centrifugal tumbling step, to recombine the subflows into the flow of granules.

As in the preceding embodiment, optionally, the granules can be subjected to a boiling effect step by recombining the subflows into a single flow that falls onto a rigid central portion of the wheel from a drop height, so that granules bounce upwards off the rigid central portion and meet other granules falling down, whereby because the granules fall near or onto the center of the rotating wheel, there is little or no centrifugal force and the granules gather near and in the rigid central portion of the wheel, whereby this bouncing of granules within the gathered granules creates a "boiling effect" among the gathered partially coated granules near and in the rigid central portion.

The following apply to all variants of the method and apparatus of this invention.

Optionally, an additional applicator or set of applicators (which can be the same type as, or a different type from, the original applicator(s)) can be provided that applies coating material on the interior faces of the flowing subflows of granules, which coating material can be the same as, or different from, the coating material being applied on the outside faces of the flowing subflows of granules.

Optionally also, dry applicators can be provided to sprinkle or otherwise apply dry materials, such as powders (for enhancing flowability, for example) to the flow of granules, in the hopper, in the application chamber, on the wheel, in the funnel, or in the conveyor or enclosed auger. The dry applicators can be any applicators known for applying dry materials into a flow of granules, liquids, or other materials.

Alternatively, instead of a reverse conveyor with a backward running conveyor belt as described above, a conveyor with a conveyor belt that runs forwards (a "top carry conveyor" or "forward conveyor"), or some other conveyor apparatus (not necessarily a belt, such as an auger (or other device that, causes partially coated granules to roll over each other and spread coating material by gentle granule-to-granule contact)), can be used, with appropriate adjustments to angle of incline, speed and structural configuration (such as adding retarding structures such as rakes, tines or forks), so that gentle granule-to-granule contact is provided to achieve complete spreading of the coating on the granules, without damaging the granules. The granules would roll backwards over each other, thus spreading a coating by gentle granule-to-granule contact, while still being carried upwardly.

It is presently preferred that the rotation rate of the funnel be zero, so that the funnel is stationary. However, the funnel could also rotate in the opposite or same direction as the wheel (especially if the funnel is not vertical), or at the same funnel rotation rate as the wheel rotation rate, as long as adequate gentle granule-to-granule contact is provided, without substantially damaging the granules.

It is preferred that the rotation rate of the wheel be adjustable, because variations in size of granule and coating material may require different amounts of centrifugal force in order to impel the granules to the peripheral apertures in the wheel. However, in contrast, it is presently preferred that the speed of the conveyor belt in an embodiment with a backward running conveyor belt be fixed at approximately 300 feet per minute, in order to achieve sufficient rolling of the seeds over each other, but with minimal damage to the seeds or other granules.

It is presently preferred in an embodiment with a backward running conveyor belt that the angle of inclination of the conveyor belt be practically between about 15 degrees and 60 degrees, and preferably up to about 45 degrees.

It is presently preferred in an embodiment with a forward running conveyor belt, or top carry conveyor belt, that the angle of incline be greater than the angle of repose of the granules.

It is preferred that the paddles in an embodiment with a backward running conveyor belt be approximately 6 inches (approximately 15 centimeters) apart, and that the clearance between the bottoms of the paddles and the floor of the conveyor belt housing, referred to as paddle separation, be about twice the diameter of the granules, in order to allow rolling of the granules over each other and avoid damaging the granules while they are being pushed upwardly, and to maintain the desired flow speed.

It is preferred that the wheel rotate at approximately 50 to 400 revolutions per minute. However, the wheel must rotate at a slow enough rate that granules are not retained by centrifugal force at the rim of the wheel and thereby prevented or unacceptably delayed from falling through the peripheral apertures.

In order to maintain a compact size yet still achieve desired processing flow speed, it is preferred that the wheel be approximately 36 inches, or approximately one meter, in diameter.

The wheel can be rotated by any means known in the art, such as a peripheral drive wheel or central shaft drive.

Optionally, the wheel can be provided with a central portion that is raised, such as a cone, so that granules on the central part of the wheel roll outward far enough that centrifugal force impels them to the peripheral apertures. Alternatively, an air blower or other equivalent means can be provided to blow granules outward from the central part of the wheel.

Preferably, the funnel has walls that are at approximately 45 degrees, but can be up to approximately 60 degrees, depending on the rotational speeds of the funnel and the wheel.

Preferably, the converging lower walls of the application chamber are angled towards each other at approximately 45 degrees from the vertical.

Preferably, the orifice in the hopper is sufficiently large, the converging lower walls of the application chamber are sufficiently far apart, the narrow end of the funnel is wide enough, and the shape, number and size of the peripheral apertures in the wheel, are high enough, for granules to flow-through the entire apparatus at the desired processing rate.

Optionally, coating material can also be applied to seeds when they are on the wheel, or elsewhere in the apparatus.

Optionally, structural and functional features can be added to the wheel, such as vibrating the wheel to enhance movement of granules, or comb or vertical disruptors (preferably not attached to the wheel, but extending close enough to the wheel to disrupt smooth directional flow of the granules and thereby increase gentle granule-to-granule contact). Of course, the wheel or the central portion of the wheel could be flat, concave (which increases dwell time in the "boiling effect") or convex.

Optionally, also, the funnel could funnel the granules to the side, not just to the axis of the wheel.

BRIEF DESCRIPTION OF DRAWINGS

FIG. 1 is a perspective view of a presently preferred first embodiment of the apparatus of the present invention.

FIG. 2 is an elevational view, from the input end, of the embodiment of FIG. 1.

FIG. 3 is an elevational cutaway view, from the input end, of the application chamber, wheel and funnel of the embodiment of FIG. 1.

FIG. 4 is a side elevational cutaway view of the conveyor of the embodiment of FIG. 1.

FIG. 5 is a perspective view of the separator in the application chamber of the embodiment of FIG. 1.

FIG. 6 is an exploded perspective view of the wheel and funnel of the embodiment of FIG. 1.

FIG. 7 is an assembled perspective view of the wheel and funnel of the embodiment of FIG. 1.

FIG. 8 is an elevational cutaway view of the application chamber of an alternative embodiment of the present invention, with the addition of applicators applying coating material to the interior surfaces of the flow of granules.

FIG. 9 is an elevational cutaway view of an alternative embodiment of the present invention with an auger instead of a conveyor.

BEST MODES FOR CARRYING OUT THE INVENTION

The presently preferred best mode for practicing the present invention is presently illustrated by way of example in FIGS. 1 to 9.

Figure 1:
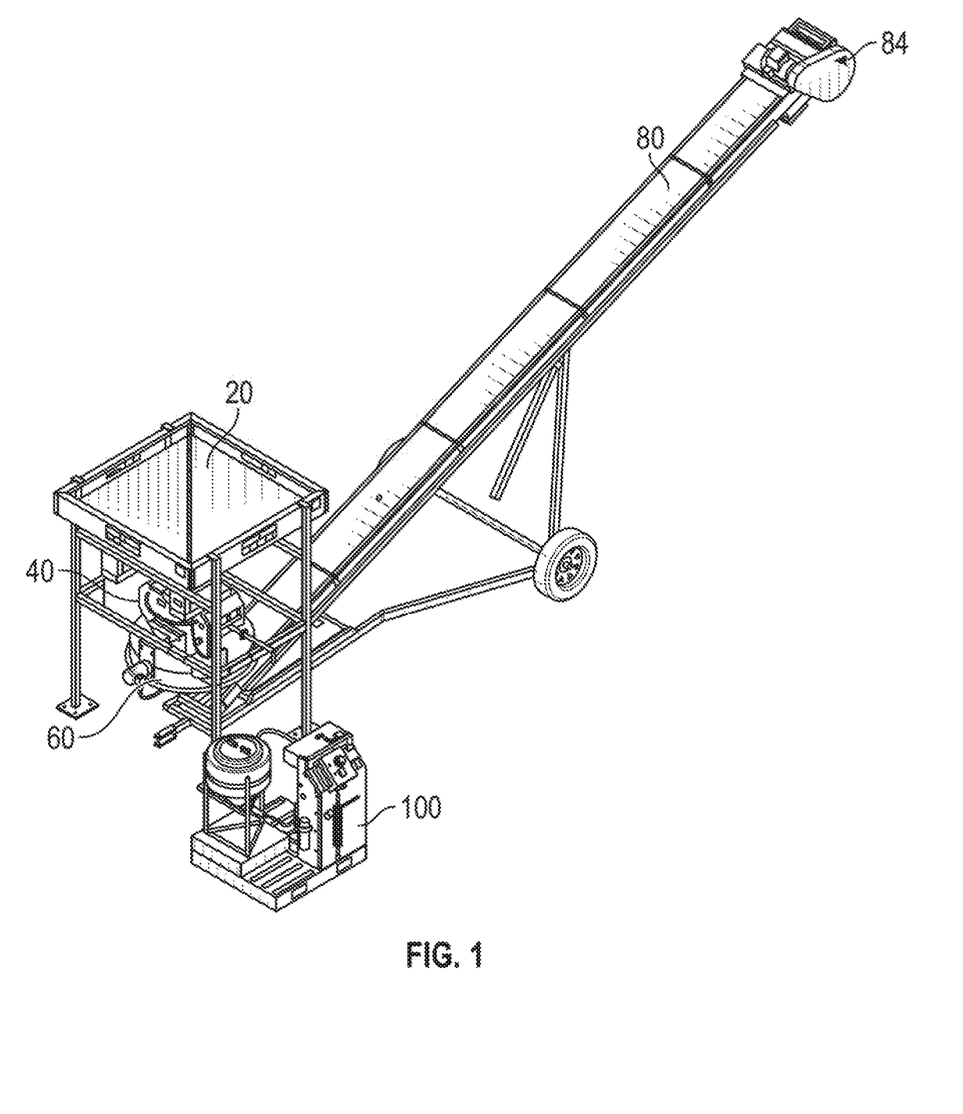

Referring to FIG. 1, shown is a perspective view of a presently preferred embodiment of the apparatus of the present invention, showing an intake hopper 20 for untreated granules, an application chamber 40, a wheel chamber 60, and a conveyor 80. The treated granules are impelled out the upper end of the conveyor 84. Also shown is an application control system 100, which controls the coating that is applied in the application chamber 40.

Figure 2:
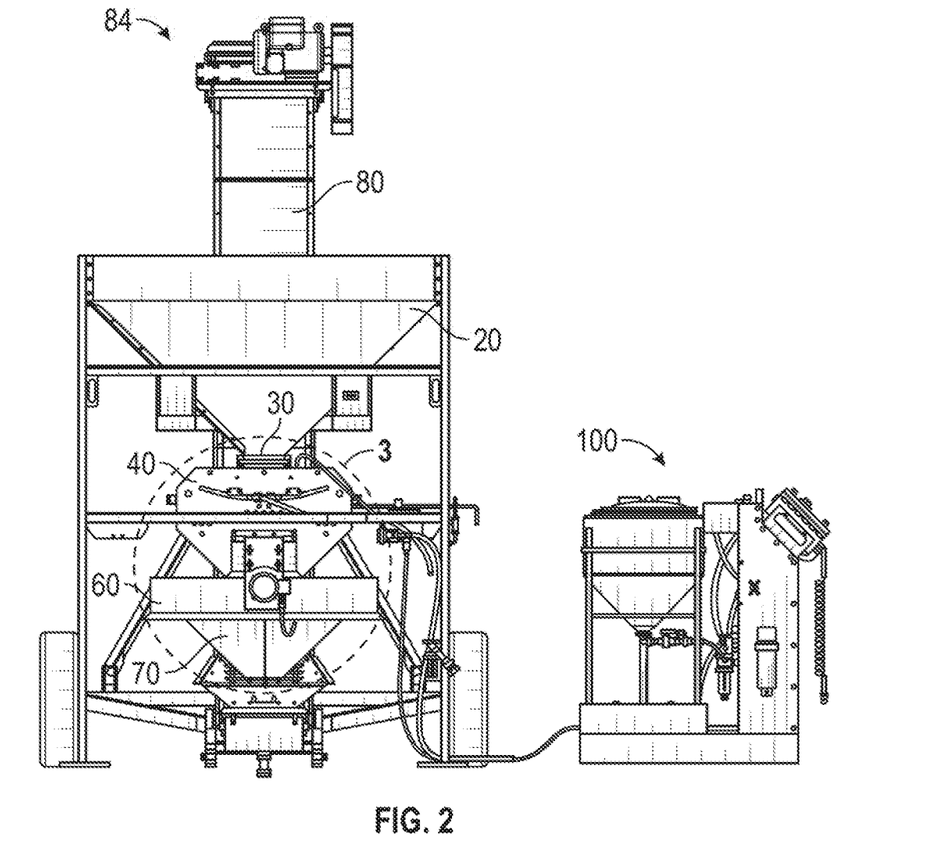

Referring to FIG. 2, shown is an elevational view from the input end of the presently preferred embodiment of the invention, also showing the intake hopper 20 having a bottom orifice 30 that leads into the application chamber 40, and the funnel 70 below the wheel chamber 60.

Figure 3:
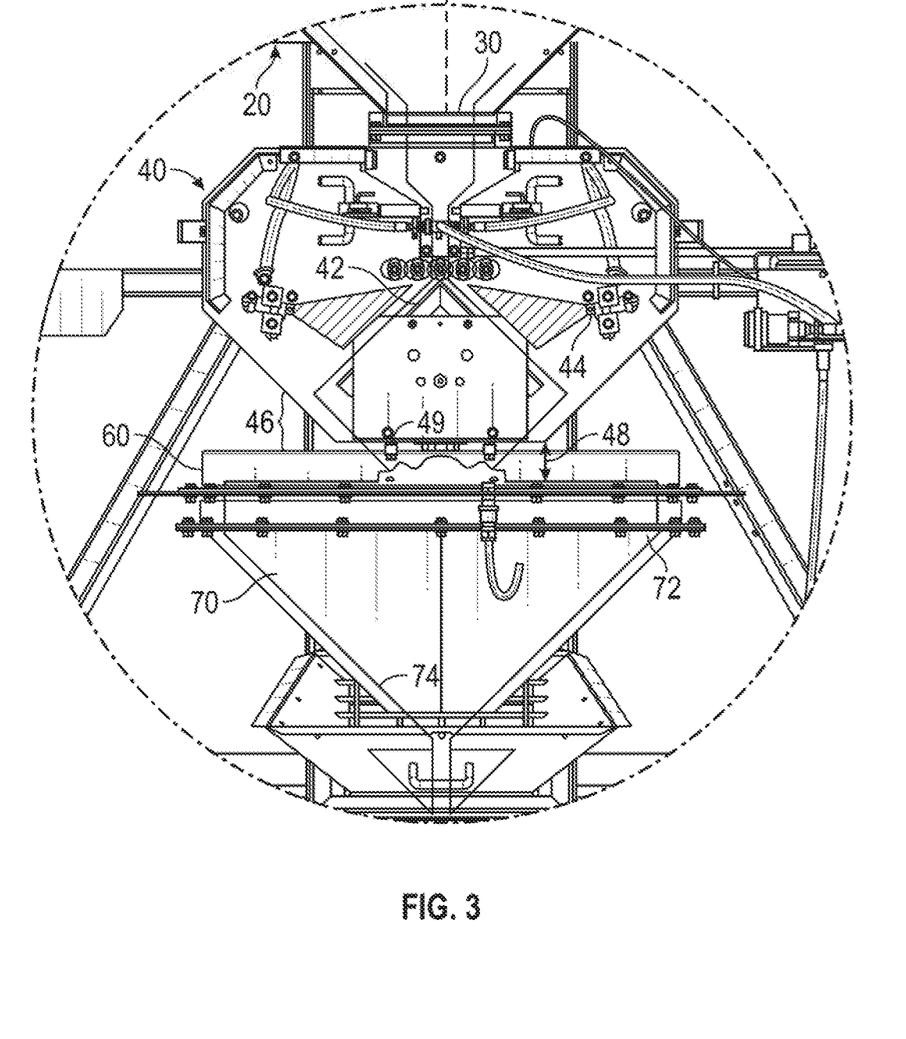

Referring to FIG. 3, shown is an elevational cutaway view, from the input end, of the application chamber, wheel and funnel of the embodiment of FIG. 1, showing the hopper 20 with its bottom orifice 30 leading into the application chamber 40; the application chamber 40 having a separator 42 leading into the wheel chamber 60; and the wheel chamber 60 leading into the funnel 70, having a wide end 72 and a narrow end 74. Applicators 44 for applying a coating material are positioned in the application chamber 40. The lower converging walls 46 of the application chamber 40 preferably converge and lead to the center of the wheel chamber 60.

Figure 4:
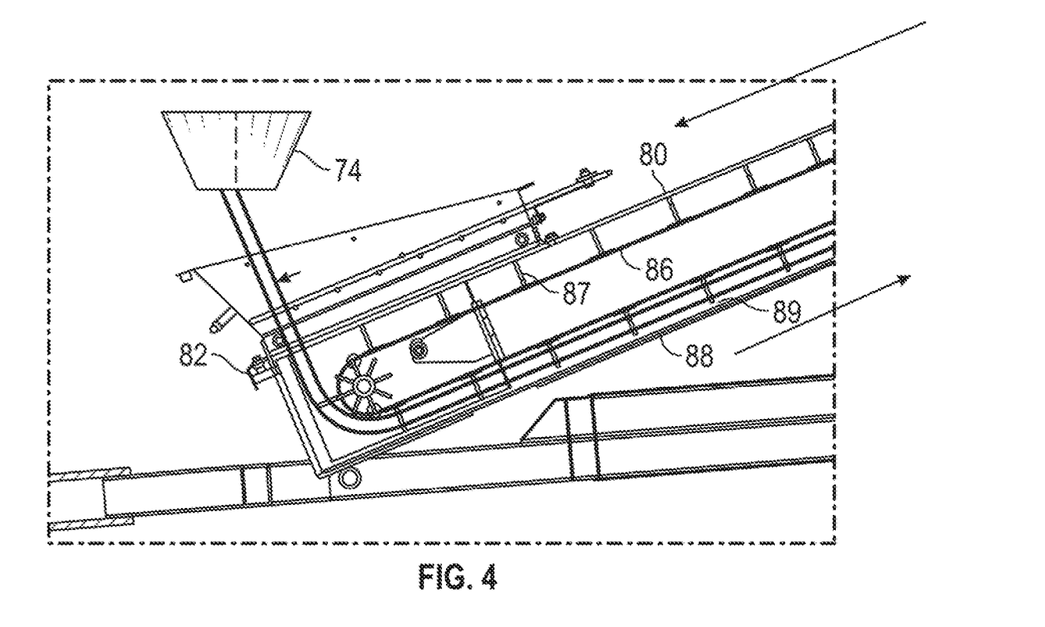

Referring to FIG. 4, shown is a side elevational cutaway view of the conveyor 80, having a bottom end 82 showing a conveyor belt 86 with projecting paddles 87 that are separated from the conveyor floor 88 by a paddle separation 89.

Figure 5:
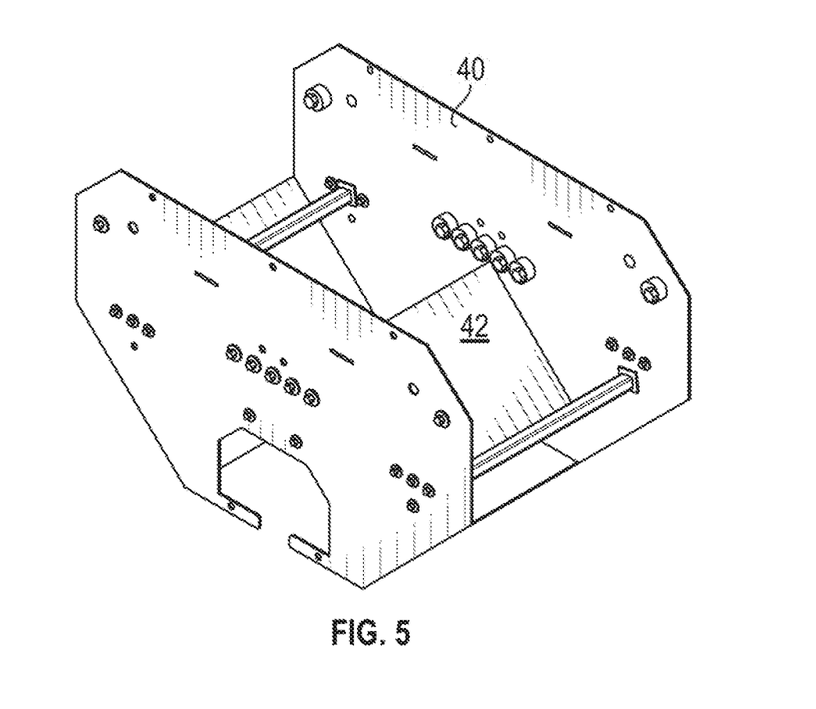

Referring to FIG. 5, shown is a perspective view of the interior of the application chamber 40, showing a separator 42.

Figure 6:
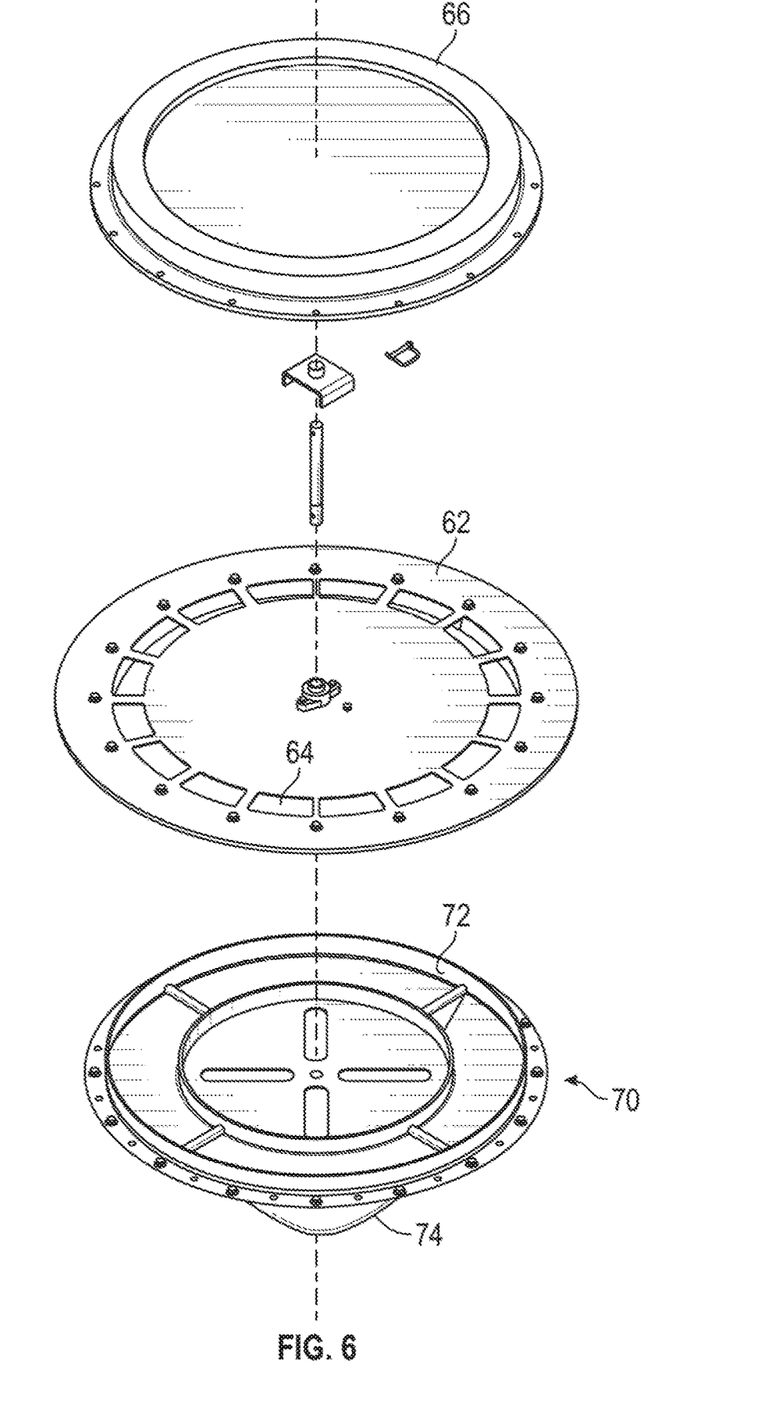

Referring to FIG. 6, shown is an exploded perspective view of the wheel assembly that is in the wheel chamber 60, comprising a wheel 62 having peripheral apertures 64, with a containment rim 66.

Figure 7:
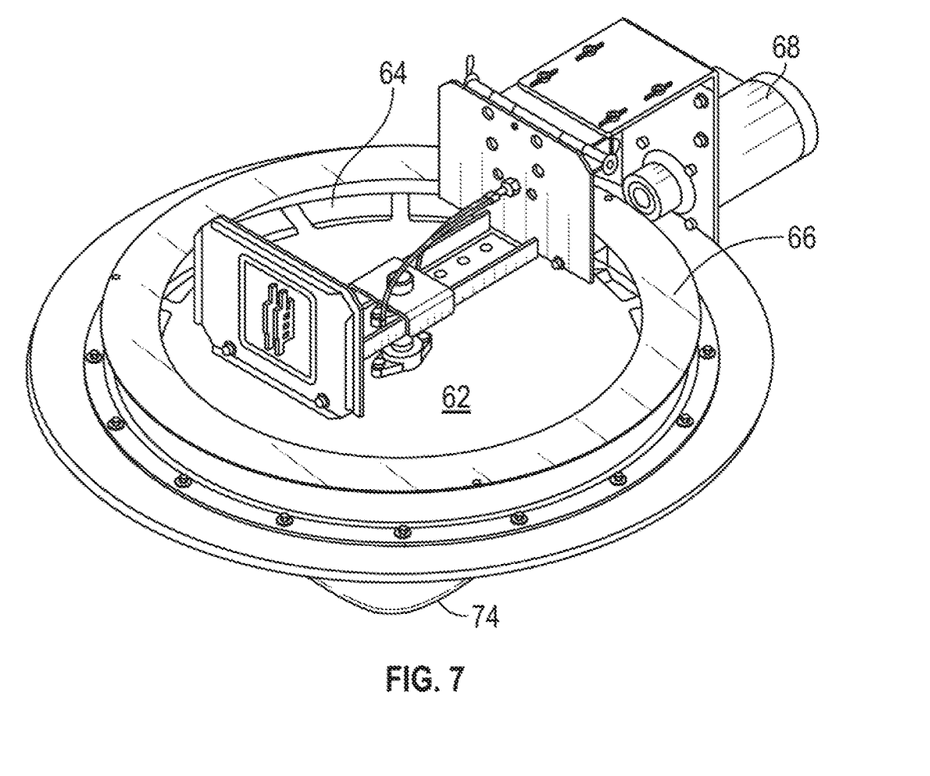

Referring to FIG. 7, shown is an assembled perspective view of the wheel assembly of FIG. 6, driven to rotate by a motor 68 engaging with the rim of the wheel 42.

The operation of this embodiment of the presently preferred embodiments of the present invention will now be described.

Referring to FIG. 2, untreated granules are received in the hopper 20, and flow through the bottom orifice 30 into the application chamber 40. Referring to FIG. 5, the flow of granules is then separated by the separator 42 into two or more subflows of granules. Returning to FIG. 3, applicators 44 spray the outward facing surfaces of the subflows of granules, which partially coats the granules in the subflows. The subflows of partially coated granules then contact the lower portion 46 of the application chamber 40 to recombine as a single flow, and then flow onto the center of the wheel 62 from a drop height 48. Referring to FIG. 6, the granules fall on the center of the wheel 62 and bounce back and meet other falling granules. Also, the wheel 62 is rotating, so the granules are impelled by centrifugal force outwards on the wheel 62, but are contained by the containment rim 66, so that the granules fall through the peripheral apertures 64 into the wide end 72 of the funnel 70, which is preferably wide enough to receive ail the granules falling through the apertures 64. Referring to FIG. 3, optionally, vertical disrupters 49 can be placed extending downwardly towards, but not contacting, the wheel 62, either closer to the center where the granules initially drop onto the wheel 62, or farther out, where the granules travel by centrifugal force. Preferably, the funnel 70 has a rotation rate that is different from the rotation rate of the wheel 62, such as where the funnel 70 is stationary or rotating faster or slower than the wheel 62.

Referring to FIG. 4, the granules then flow through the narrow end 74 of the funnel 70 and into the bottom end 82 of the inclined conveyor 80 and onto the conveyor belt 86. Preferably, the conveyor belt 86 is rotating "backwards", with the upper portion moving downwardly, and the lower portion moving upwardly. The paddles 87 then push bunches of granules up the conveyor floor 88 because the paddle separation 89 is several times the size of the granules (preferably twice the size of the granules), but there are multiple layers of granules, so that the granules roll over each other and are conveyed gently up the conveyor 80, to exit out the top end 84.

As can be seen from the above, this invention enables coating of the granules using the following gentle process.

The separator 42 separates a flow of the granules into two or more flowing subflows of granules. The applicators 44 then apply a desired coating material (preferably spreadable by granule-to-granule contact) onto a surface of the flowing subflows of granules, so that granules in the subflows are partially coated. Converging lower walls 46 of the application chamber 40 recombine the flowing subflows of granules into a single flow of granules.

The flow of partially coated granules then falls onto the wheel 62 from the drop height 48, so that granules bounce against each other near and in the center of the wheel 62, creating a "boiling effect" that spreads the coating material by gentle granule-to-granule contact.

The wheel assembly 60 then centrifugally tumbles the granules against each other, by flowing Lite granules onto the wheel 62 rotating at a wheel rotation rate around a substantially vertical axis of rotation. The wheel 62 has peripheral apertures 64 larger than the coated granules, so the granules are impelled by centrifugal force to the peripheral apertures 64 and fall through the peripheral apertures 64 with the wheel's momentum, resulting in centrifugal tumbling granules. The coating material is spread on the granules by gentle granule-to-granule contact and by contact with any of the coating material on the wheel 62. Optionally, vertical disrupters 49 can be provided to disrupt the "boiling effect" of the granules in the center of the wheel 62 and/or to disrupt outward flow of the granules towards the peripheral apertures 64, thus increasing the "dwell time" of the granules near the center of the wheel 62 and increasing spreading there through gentle granule-to-granule contact.

After the granules fall through the apertures 64, the funnel 70 causes funnel tumbling of the granules against each other, because the centrifugal tumbling granules flow down the funnel 70 (which has narrowing funnel walls and, preferably, a funnel rotation rate different from the wheel rotation rate). However, the funnel rotation rate can also be the same as the wheel rotation rate, or can be zero. The centrifugal tumbling granules contact the funnel walls rotating at the funnel rotation rate as the granules flow down the narrowing funnel 70, resulting in funnel tumbling granules, so that coating material is further spread on the granules by gentle granule-to-granule contact and by contact with any of the coating material on said funnel walls.

The conveyor 80 then gently rolls the granules against each other as follows: the bottom end 82 of the conveyor is positioned to receive granules flowing from the narrow end 74 of the funnel 70, so that the granules flow into the bottom end 82 of the conveyor 80, which is tilted at an inclined angle, and has a conveyor belt 86, and a conveyor floor 88 underneath and substantially parallel to the belt. The belt, has paddles 87 that extend outwardly from the belt towards the conveyor floor 88, with the paddles and the conveyor floor separated by a paddle separation 89. The paddle separation is more than the size of the granules (preferably at least approximately twice the size of the granules), so that when the conveyor belt 86 spins backwards (so that the paddles 87 on the bottom of the belt move upwardly along the floor 88), the paddles 87 push granules that are on the floor 88 upwardly, and the granules roll over each other, so that the coating material is further spread on the granules by gentle granule-to-granule contact and by contact with any of the coating material on the floor 88, until the granules are discharged out the top end 84.

Figure 8:
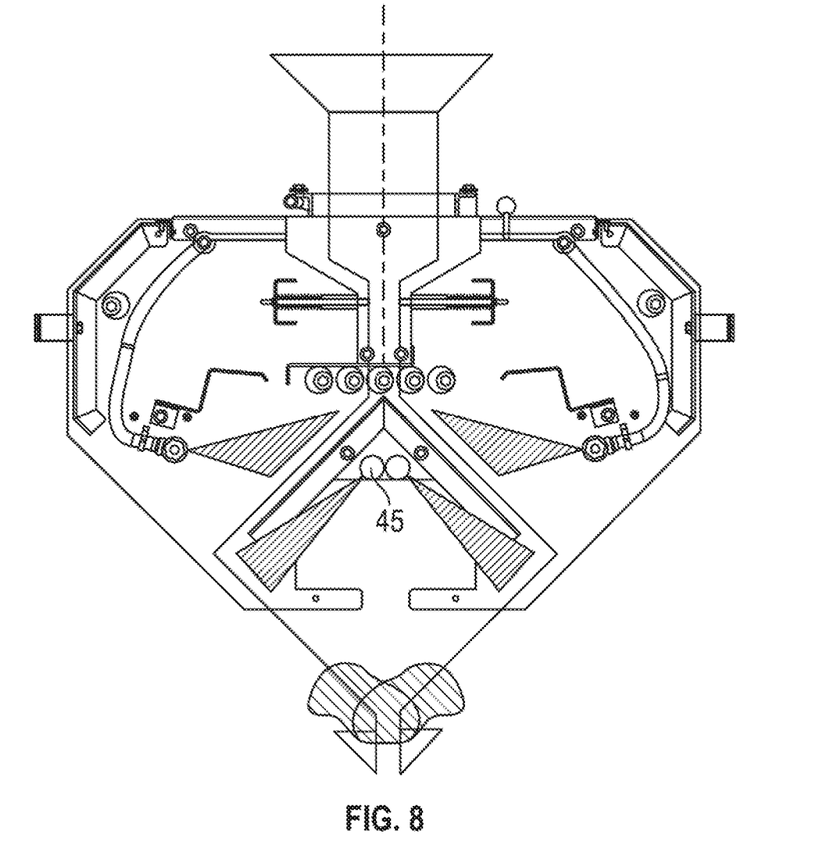

Referring to FIG. 8, shown is a side elevational cutaway view of an alternative preferred embodiment of the present invention, in which additional applicators 45 apply coating material to the additional (here inner) exposed surfaces of the subflows of granules.

Figure 9:
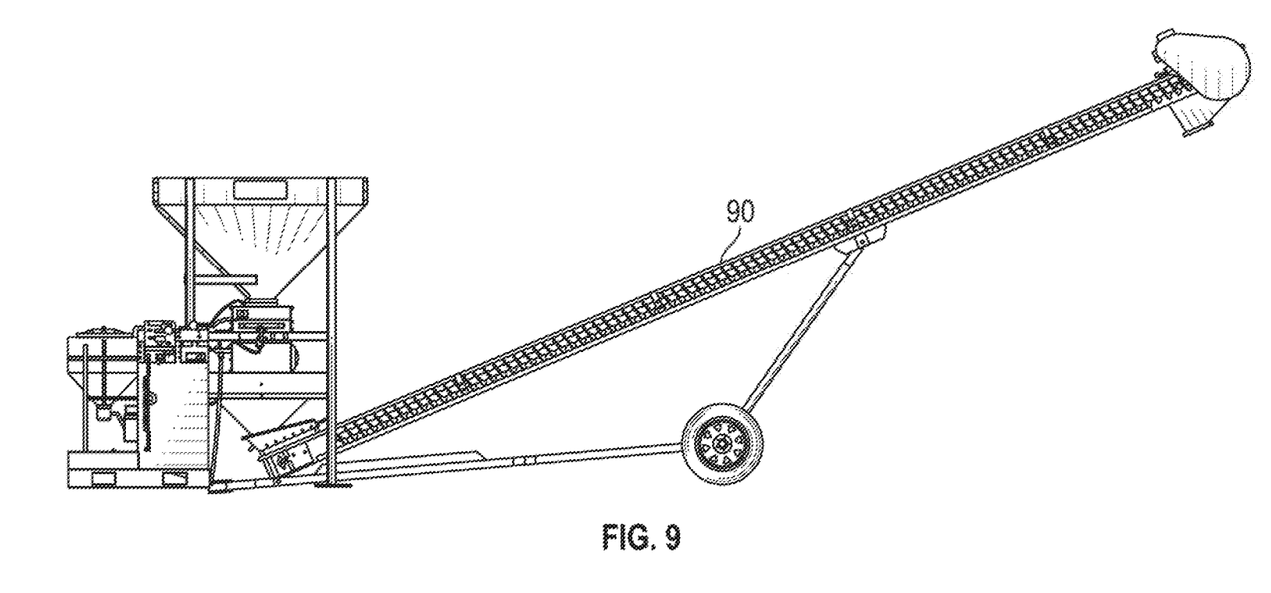

Referring to FIG. 9, shown is a side elevational cutaway view of another alternative preferred embodiment, of the present invention, in which an enclosed auger 90 is used instead of a conveyor 80.

While the present invention has been disclosed in connection with the presently preferred best mode described herein, it should be understood that the best mode includes words of description and illustration, rather than words of limitation. There may be other embodiments which fall within the spirit and scope of the invention as defined by the claims. Accordingly, no limitations are to be implied or inferred in this invention, except as specifically and explicitly set forth in the claims.

INDUSTRIAL APPLICABILITY

The present invention is applicable whenever it is desired to coat flowable contact-tolerant granules with a coating, including seeds.

What is claimed is:

1. An apparatus for coating flowable contact-tolerant granules, comprising:
a hopper to receive said granules having a bottom orifice;
an application chamber having a separator positioned below said orifice and converging lower walls, whereby granules flowing from said hopper into said application chamber and over said separator are separated into flowing subflows of granules;
at least one applicator positioned in said application chamber to apply a coating material onto said flowing subflows of granules and to partially coat said granules in said subflows, wherein said converging lower walls recombine said flowing subflows of granules into said flow of granules;
a wheel having a rigid central portion rotating at a wheel rotation rate around a substantially vertical axis of rotation, said wheel having peripheral apertures larger than said granules, said central portion being positioned a drop height below said converging lower walls of said application chamber, whereby when said granules fall onto said rigid central portion of said rotating wheel from said drop height, said granules bounce and contact other granules, whereby said coating material is spread on said granules by gentle granule-to-granule contact and by contact with any of said coating material on said wheel and said granules are impelled by centrifugal force to said peripheral apertures and fall through said peripheral apertures with wheel momentum;
a funnel having funnel walls, a wide end, and a narrow end, said wide end being positioned under said wheel and being wide enough to receive granules falling through said peripheral apertures, said funnel having a funnel rotation rate, whereby when said granules fall through said peripheral apertures with wheel momentum and contact said funnel walls rotating at said funnel rotation rate and fall down said funnel walls towards said narrow end, said granules tumble against each other, and coating material is further spread on said granules by gentle granule-to-granule contact and by contact with any of said coating material on said funnel walls;
an enclosed auger tilted at an inclined angle, having a top end and a bottom end, open at both top and bottom ends, with said bottom end positioned to receive granules falling through said narrow end of said funnel, whereby when said auger rotates, granules are pushed upwardly, whereby said granules roll over each other and said coating material is further spread on said granules by gentle granule-to-granule contact and by contact with any of said coating material in said auger, until said granules are discharged out the top end.

2. An apparatus for coating flowable contact-tolerant granules having an angle of repose, comprising:
a hopper to receive said granules having a bottom orifice;
an application chamber having a separator positioned below said orifice and converging lower walls, whereby when granules flow from said hopper into said application chamber and over said separator, said granules are separated into flowing subflows of granules;
at least one applicator positioned in said application chamber to apply a coating material onto said flowing subflows of granules and to partially coat said granules in said subflows, whereby when said flowing subflows of granules contact said converging lower walls of said application chamber, said flowing subflows of granules recombine into said flow of granules;
a wheel having a rigid central portion rotating at a wheel rotation rate around a substantially vertical axis of rotation, said wheel having peripheral apertures larger than said granules, said central portion being positioned a drop height below said converging lower walls of said application chamber, whereby when said granules fall onto said rigid central portion of said rotating wheel from said drop height, said granules bounce and contact other granules, whereby said coating material is spread on said granules by gentle granule-to-granule contact and by contact with any of said coating material on said wheel, and said granules are impelled by centrifugal force to said peripheral apertures and fall through said peripheral apertures with wheel momentum;
a funnel having funnel walls, a wide end, and a narrow end, said wide end being positioned under said wheel and being wide enough to receive all granules falling through said peripheral apertures, said funnel having a funnel rotation rate, whereby when said granules fall through said peripheral apertures with said wheel momentum and contact said funnel walls rotating at said funnel rotation rate and fall down said funnel walls towards said narrow end, said granules tumble against each other, and coating material is further spread on said granules by gentle granule-to-granule contact and by contact with any of said coating material on said funnel walls;

a conveyor, tilted at an inclined angle greater than said angle of repose, open at both top and bottom ends, with said bottom end positioned to receive granules falling through said narrow end of said funnel, having a conveyor belt;

whereby, when said conveyor belt spins forwards, said granules roll backwards over each other and said coating material is further spread on said granules by gentle granule-to-granule contact and by contact with any of said coating material on said conveyor belt, until said granules are discharged out said top end.

3. An apparatus for coating flowable contact-tolerant granules, comprising:

an application chamber to receive a flow of said granules;

at least one applicator positioned in said application chamber to apply a coating material onto said flow of granules while said flow of granules is in said application chamber, to partially coat said granules to create granules partially coated with a coating material;

a wheel having a rigid central portion rotating at a wheel rotation rate around a substantially vertical axis of rotation, said wheel having peripheral apertures larger than said granules, positioned a drop height below said application chamber, whereby when said granules fall onto said rigid central portion of said rotating wheel from said application chamber, said granules bounce and contact other granules, whereby said coating material is spread on said granules by gentle granule-to-granule contact and by contact with any of said coating material on said wheel, and said granules are impelled by centrifugal force to said peripheral apertures and fall through said peripheral apertures with wheel momentum;

a funnel having funnel walls, a wide end, and a narrow end, said wide end being positioned under said wheel and being wide enough to receive all granules falling through said peripheral apertures, said funnel having a funnel rotation rate, whereby when said granules fall through said peripheral apertures with wheel momentum and contact said funnel walls rotating at said funnel rotation rate and fall down said funnel walls towards said narrow end, said granules tumble against each other, and coating material is further spread on said granules by gentle granule-to-granule contact and by contact with any of said coating material on said funnel walls; and a roller positioned to receive granules falling through said narrow end of said funnel that gently rolls said granules against each other, whereby said coating material is further spread on said granules by gentle granule-to-granule contact.

4. An apparatus according to claim 3, wherein said roller is selected from the group consisting of:

(a) a conveyor, tilted at an inclined angle, open at both top and bottom ends, with said bottom end positioned to receive granules falling through said narrow end of said funnel, having a conveyor belt, a conveyor floor underneath and substantially parallel to said belt extending between said top and bottom ends, paddles that extend downwardly from said belt towards, and in close proximity to, said conveyor floor, said paddles and said conveyor floor being separated by a paddle separation, whereby, when said conveyor belt spins backwards, so that said paddles in said close proximity to said conveyor floor move upwardly along said incline, said paddles push granules that are on said floor upwardly, whereby said granules roll over each other and said coating material is further spread on said granules by gentle granule-to-granule contact and by contact with any of said coating material on said floor, until said granules are discharged out said top end;

(b) an enclosed auger tilted at an inclined angle, having a top end and a bottom end, open at both top and bottom ends, with said bottom end positioned to receive granules falling through said narrow end of said funnel, whereby when said auger rotates, granules are pushed upwardly, whereby said granules roll over each other and said coating material is further spread on said granules by gentle granule-to-granule contact and by contact with any of said coating material in said auger, until said granules are discharged out said top end; and (c) a conveyor belt, tilted at an inclined angle greater than the angle of repose of said granules, having top and bottom ends, with said bottom end positioned to receive granules from said funnel, further comprising retarding structures attached to said conveyor belt to constrain a sufficient portion of said granules to be carried upwards, whereby when the conveyor belt spins forwardly, said granules roll over each other backwards as said granules are conveyed upwards, and said coating material is further spread on said granules by gentle granule-to-granule contact and by contact with any of said coating material on said conveyor belt, until said granules are discharged out said top end.

5. An apparatus for coating flowable contact-tolerant granules, comprising:

an application chamber to receive a flow of said granules;

at least one applicator positioned in said application chamber to apply a coating material onto said flow of granules while said flow of granules is in said application chamber, to partially coat said granules to create granules partially coated with said coating material;

a wheel having a rigid central portion rotating at a wheel rotation rate around a substantially vertical axis of rotation, said wheel having peripheral apertures larger than said granules, positioned a drop height below said application chamber, whereby when said granules fall onto said rigid central portion of said rotating wheel from said application chamber, said granules bounce and contact other granules, said coating material is spread on said granules by gentle granule-to-granule contact and by contact with any of said coating material on said wheel, and said granules are impelled by centrifugal force to said peripheral apertures and fall through said peripheral apertures with wheel momentum;

a funnel having funnel walls, a wide end, and a narrow end, said wide end being positioned under said wheel and being wide enough to receive granules falling through said peripheral apertures, said funnel having a funnel rotation rate, whereby when said granules fall through said peripheral apertures with wheel momentum and contact said funnel walls rotating at said funnel rotation rate and fall down said funnel walls towards said narrow end, said granules tumble against each other, and coating material is further spread on said granules by gentle granule-to-granule contact and by contact with any of said coating material on said funnel walls.

6. An apparatus according to claim 5, wherein said funnel has a non-circular cross section.

7. An apparatus according to claim 5, further comprising:
a hopper to receive said granules having a bottom orifice;
wherein said application chamber is positioned below said orifice, whereby said granules flow from said hopper into said application chamber.

8. In an apparatus for coating flowable contact-tolerant granules, the improvement comprising:
an application chamber to receive a flow of said granules;
at least one applicator positioned in said application chamber to apply a coating material onto said flow of granules while said flow of granules is in said application chamber, to partially coat said granules to create granules partially coated with said coating material;
a wheel having a rigid central portion rotating at a wheel rotation rate around a substantially vertical axis of rotation, said wheel having peripheral apertures larger than said granules, positioned a drop height below said application chamber, whereby when said granules fall onto said rigid central portion of said rotating wheel from said application chamber, said granules bounce and contact other granules, and said coating material is spread on said granules by gentle granule-to-granule contact and by contact with any of said coating material on said wheel, and said granules are impelled by centrifugal force to said peripheral apertures and fall through said peripheral apertures with wheel momentum;
a funnel having funnel walls, a wide end, and a narrow end, said wide end being positioned under said wheel and being wide enough to receive granules falling through said peripheral apertures, said funnel having a funnel rotation rate, whereby when said granules fall through said peripheral apertures with wheel momentum and contact said funnel walls rotating at said funnel rotation rate and fall down said funnel walls towards said narrow end, said granules tumble against each other, and said coating material is further spread on said granules by gentle granule-to-granule contact and by contact with any of said coating material on said funnel walls.

9. An apparatus for coating flowable contact-tolerant granules, comprising:
a hopper to receive said granules having a bottom orifice;
an application chamber having a separator positioned below said orifice and converging lower walls, whereby when granules flow from said hopper into said application chamber and over said separator, said granules are separated into flowing subflows of granules;
at least one applicator positioned in said application chamber to apply a coating material onto said flowing subflows of granules and to partially coat said granules in said subflows, whereby when said flowing subflows of granules contact said converging lower walls of said application chamber, said flowing subflows of granules recombine into said flow of granules;
a wheel having a rigid central portion rotating at a wheel rotation rate around a substantially vertical axis of rotation, said wheel having peripheral apertures larger than said granules, said central portion being positioned a drop height below said converging lower walls of said application chamber, whereby when said granules fall onto said rigid central portion of said rotating wheel from said drop height, said granules bounce and contact other granules, whereby said coating material is spread on said granules by gentle granule-to-granule contact and by contact with any of said coating material on said wheel, and said granules are impelled by centrifugal force to said peripheral apertures and fall through said peripheral apertures with wheel momentum;
a funnel having funnel walls, a wide end, and a narrow end, said wide end being positioned under said wheel and being wide enough to receive all granules falling through said peripheral apertures, said funnel having a funnel rotation rate, whereby when said granules fall through said peripheral apertures with said wheel momentum and contact said funnel walls rotating at said funnel rotation rate and fall down said funnel walls towards said narrow end, said granules tumble against each other, and coating material is further spread on said granules by gentle granule-to-granule contact and by contact with any of said coating material on said funnel walls;
a conveyor, tilted at an inclined angle, open at both top and bottom ends, with said bottom end positioned to receive granules falling through said narrow end of said funnel, having a conveyor belt;
a conveyor floor underneath, and substantially parallel to, said belt, extending between said top and bottom ends;
paddles that extend downwardly from said belt towards, and in close proximity to, said conveyor floor, whereby said paddles and said conveyor floor are separated by a paddle separation;
whereby, when said conveyor belt spins backwards, so that said paddles in said close proximity to said conveyor floor move upwardly at said incline, said paddles push granules that are on said floor upwardly, whereby said granules roll over each other and said coating material is further spread on said granules by gentle granule-to-granule contact and by contact with any of said coating material on said floor, until said granules are discharged out said top end.

10. An apparatus according to claim 9, wherein said paddle separation is larger than said granules.

11. An apparatus according to claim 9, 1 or 2, wherein said drop height is at least approximately 1 inch (approximately 2.5 centimeters).

12. An apparatus according to any one of claim 9, 1, 2, 3, 5 or 8, wherein said funnel rotation rate is the same as said wheel rotation rate.

13. An apparatus according to any one of claim 9, 1, 2, 3, 5 or 8, wherein said funnel rotation rate is different from said wheel rotation rate.

* * * * *